(12) United States Patent
Seong et al.

(10) Patent No.: US 12,386,391 B2
(45) Date of Patent: Aug. 12, 2025

(54) SLIDABLE DISPLAY DEVICE

(71) Applicant: Samsung Display Co., Ltd., Yongin-si (KR)

(72) Inventors: Juyeop Seong, Suwon-si (KR); Hee-Kwon Lee, Asan-si (KR); Jae-Soo Jang, Suwon-si (KR); Jaewon Jeong, Cheonan-si (KR); Sungyeon Cho, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 245 days.

(21) Appl. No.: 18/082,833

(22) Filed: Dec. 16, 2022

(65) Prior Publication Data
US 2023/0341901 A1    Oct. 26, 2023

(30) Foreign Application Priority Data

Apr. 26, 2022    (KR) .................. 10-2022-0051621

(51) Int. Cl.
*G06F 1/16*      (2006.01)
*G02F 1/1333*    (2006.01)

(52) U.S. Cl.
CPC ...... *G06F 1/1652* (2013.01); *G02F 1/133322* (2021.01)

(58) Field of Classification Search
CPC .. G06F 1/1652; G06F 1/1624; H04M 1/0237; G02F 1/133322
See application file for complete search history.

(56) References Cited

U.S. PATENT DOCUMENTS 10,021,795 B2 *   7/2018   Hsu .................... H04M 1/0216
10,887,438 B2      1/2021   Baek et al.

FOREIGN PATENT DOCUMENTS

| KR | 1020200115940 A | 10/2020 |
|---|---|---|
| KR | 1020200135359 A | 12/2020 |
| KR | 102319310 B1 | 11/2021 |

\* cited by examiner

*Primary Examiner* — James Wu
(74) *Attorney, Agent, or Firm* — CANTOR COLBURN LLP (57) ABSTRACT

A display device includes: a display module including a first display region and a second display region extending from a side of the first display region, where one portion having a curved shape is defined in a portion of the second display region; a support layer disposed on a bottom surface of the display module; and a plurality of segment members, each including a center part, a support part extending from the center part and making direct contact with a bottom surface of the support layer in a region overlapping the second display region, an extension part extending from the center part in a direction intersecting an extension direction of the support part and defining a coupling groove together with the support part, and a coupling part extending from the center part in a direction opposite to the coupling groove.

18 Claims, 8 Drawing Sheets

SLIDABLE DISPLAY DEVICE

This application claims priority to Korean Patent Application No. 10-2022-0051621, filed on Apr. 26, 2022, and all the benefits accruing therefrom under 35 U.S.C. § 119, the content of which in its entirety is herein incorporated by reference.

BACKGROUND

1. Field

Embodiments of the disclosure relate to a slidable display device.

2. Description of the Related Art

A display device typically refers to a device configured to display an image. Recently, a slidable display device capable of decreasing or increasing an area of a display region by repeatedly sliding in and out has been spotlighted.

The slidable display device may include a first display region exposed to an outside thereof and a second display region extending from the first display region and accommodated in the slidable display device. When the slidable display device is in a sliding-in state, the second display region may be accommodated in the slidable display device. When the slidable display device slides out from the sliding-in state, the second display region may be exposed to the outside of the slidable display device.

In such a slidable display device, the second display region may include a curved region having a curved shape to accommodate the second display region in the slidable display device. As the slidable display device repeatedly slides in and out, a position of the curved region in the second display region may vary. In other words, the second display region may be repeatedly curved or uncurved (or flattened).

SUMMARY

When a slidable display device repeatedly slides in and out, the slidable display device may be damaged in a repeated curved second display region. Accordingly, a display defect of the slidable display device may occur so that display performance may deteriorate.

The slidable display device may include an accommodation space for accommodating the second display region. As a size of the accommodation space decreases, a size of the slidable display device may be decreased. Accordingly, it may be desired for a slidable display device having improved space efficiency to accommodate the second display region in a relatively narrow accommodation space.

Embodiments of the disclosure provide a slidable display device having improved display performance.

Embodiments of the disclosure provide a slidable display device having improved space efficiency.

According embodiments of the disclosure, a display device includes: a display module including a first display region and a second display region extending from a side of the first display region, where one portion having a curved shape is defined in a portion of the second display region; a support layer disposed on a bottom surface of the display module; and a plurality of segment members, where each of the segment members includes a center part, a support part extending from the center part and making direct contact with a bottom surface of the support layer in a region overlapping the second display region, an extension part extending from the center part in a direction intersecting an extension direction of the support part and defining a coupling groove together with the support part, and a coupling part extending from the center part in a direction opposite to the coupling groove. In such an embodiment, the coupling part of one segment member of two adjacent segment members disposed under the one portion of the display module is engaged with the support part of the other segment member of the two adjacent segment members and spaced apart from the extension part of the other segment member of the two adjacent segment members while being within the coupling groove of the other segment member of the two adjacent segment members.

According to an embodiment, each of the segment members may further include: a first protrusion protruding from one end of the support part spaced apart from the center part in a direction away from the bottom surface of the display module; and a second protrusion protruding from one end of the extension part spaced apart from the center part in a direction opposite to a protruding direction of the first protrusion.

According to an embodiment, each of the segment members may further include: a third protrusion protruding from one end of the coupling part spaced apart from the center part in the direction opposite to the protruding direction of the first protrusion; and a fourth protrusion protruding from the one end of the coupling part in the protruding direction of the first protrusion.

According to an embodiment, the third protrusion of the one segment member of the two adjacent segment members may be engaged with the first protrusion of the other segment member of the two adjacent segment members.

According to an embodiment, the fourth protrusion of the one segment member of the two adjacent segment members may be spaced apart from the second protrusion of the other segment member of the two adjacent segment members and the extension part of the other segment member of the two adjacent segment members.

According to an embodiment, two adjacent segment members which are adjacent to the one portion of the display module and disposed under another portion of the display module having a flat shape in the second display region may be spaced apart from each other.

According to an embodiment, each of the segment members may further include a guide part protruding from a side surface of the extension part thereof.

According to an embodiment, the display device may further include a guide rail disposed on sides of the display module and having a curved shape to correspond to a curved shape of the one portion of the display module.

According to an embodiment, the guide part may make direct contact with the guide rail.

According to an embodiment, the display module may further include a resistance measurement wire disposed in the second display region and extending in an extension direction of the second display region.

According to embodiments of the disclosure, a display device includes: a display module including a first display region and a second display region extending from aside of the first display region, where the second display region includes a first curved region and a second curved region which is adjacent to the first curved region, one portion having a curved shape is defined in the first curved region and another portion, which is adjacent to the one portion and has a curved shape, is defined in the second curved region; and a support layer disposed on a bottom surface of the display module, where an imaginary line connecting a first curvature center of the one portion of the display module in the first curved region to a second curvature center of the another portion of the display module in the second curved region passes through the display module.

According to an embodiment, the display device may further include a plurality of segment members, where each of the segment members includes a center part, a support part extending from the center part and making direct contact with a bottom surface of the support layer in a region overlapping the second display region, an extension part extending from the center part in a direction intersecting an extension direction of the support part and defining a coupling groove together with the support part, and a coupling part extending from the center part in a direction opposite to the coupling groove.

According to an embodiment, the coupling part of one segment member of two adjacent segment members disposed under the another portion of the display module may be engaged with the extension part of the other segment member of the two adjacent segment members and spaced apart from the support part of the other segment member of the two adjacent segment members while being within the coupling groove of the other segment member of the two adjacent segment members.

According to an embodiment, each of the segment members may further include: a first protrusion protruding from one end of the support part spaced apart from the center part in a direction away from the bottom surface of the display module; a second protrusion protruding from one end of the extension part spaced apart from the center part in a direction opposite to a protruding direction of the first protrusion; a third protrusion protruding from one end of the coupling part spaced apart from the center part in the direction opposite to the protruding direction of the first protrusion; and a fourth protrusion protruding from the one end of the coupling part in the protruding direction of the first protrusion.

According to an embodiment, the fourth protrusion of the one segment member of the two adjacent segment members may be engaged with the second protrusion of the other segment member of the two adjacent segment members.

According to an embodiment, the third protrusion of the one segment member of the two adjacent segment members may be spaced apart from the first protrusion of the other segment member of the two adjacent segment members and the support part of the other segment member of the two adjacent segment members.

According to an embodiment, the coupling part of one segment member of two adjacent segment members disposed under the one portion of the display module may be engaged with the support part of the other segment member of the two adjacent segment members and spaced apart from the extension part of the other segment member of the two adjacent segment members while being within the coupling groove of the other segment member of the two adjacent segment members.

According to an embodiment, each of the segment members may further include a guide part protruding from a side surface of the extension part thereof.

According to an embodiment, the display device may further include a guide rail disposed on sides of the display module and having a curved shape to correspond to a curve shape of the one portion of the display module and another portion of the display module.

According to an embodiment, the display module may further include a resistance measurement wire disposed in the second display region and extending in an extension direction of the second display region.

According to embodiments of the disclosure, a display device may include: a display module including a first display region and a second display region, where one portion having a curved shape is defined in a portion of the second display region; a support layer disposed on a bottom surface of the display module; and a plurality of segment members, where each of the segment members includes a center part, a support part extending from the center part and making direct contact with a bottom surface of the support layer in a region overlapping the second display region, an extension part extending from the center part in a direction intersecting an extension direction of the support part and defining a coupling groove together with the support part, and a coupling part extending from the center part in a direction opposite to the coupling groove. In such an embodiment, the coupling part of one segment member of two adjacent segment members disposed under the one portion of the display module is engaged with the support part of the other segment member of the two adjacent segment members and spaced apart from the extension part of the other segment member of the two adjacent segment members while being in the coupling groove of the other segment member of the two adjacent segment members. In such embodiments, the one segment member of two adjacent segment members disposed under the one portion of the display module may be engaged with the other segment member of the two adjacent segment members, so that even when the display device is repeatedly curved or uncurved, the one segment member and the other segment member of the two adjacent segment members may be effectively prevented from being misaligned.

According to embodiments of the disclosure, a display device may include: a display module including a first display region and a second display region extending from a side of the first display region, where the second display region includes a first curved region and a second curved region which is adjacent to the first curved region, one portion having a curved shape is defined in the first curved region and another portion, which is adjacent to the one portion and has a curved shape, is defined in the second curved region; and a support layer disposed on a bottom surface of the display module, where an imaginary line connecting a first curvature center of the one portion of the display module in the first curved region to a second curvature center of the another portion of the display module in the second curved region passes through the display module. In such embodiments, the display module may be curved in each of the first and second curved regions, so that space efficiency inside the display device can be improved.

However, features of the disclosure are not limited to those described above, and may be variously expanded without departing from the idea and scope of the disclosure.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the disclosure will be described in detail with reference to the accompanying drawings.

Figure 1:
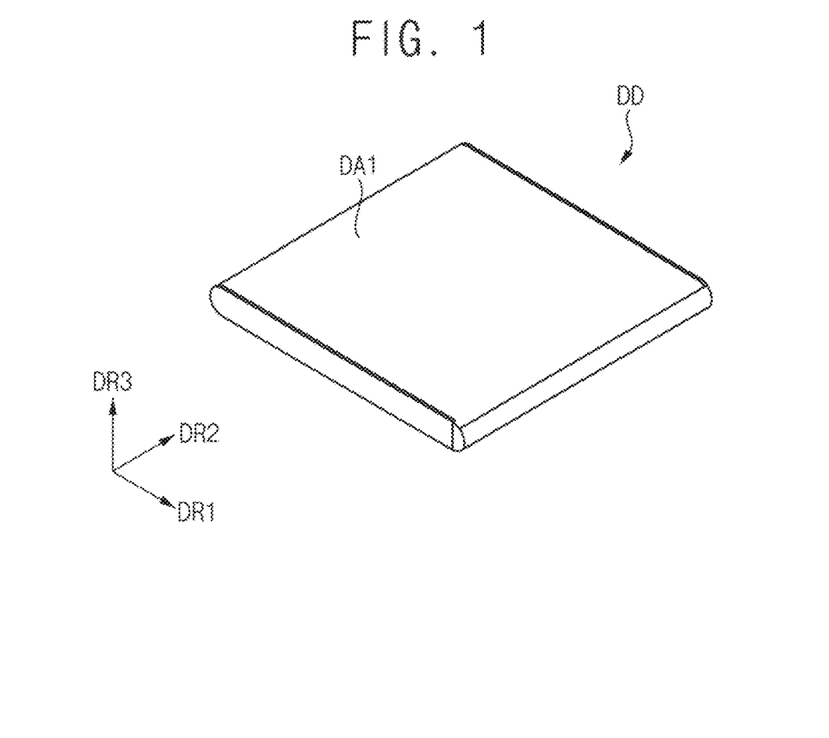
FIGS. 1 and 2 are perspective views of a display device according to embodiments of the disclosure.
Figure 2:
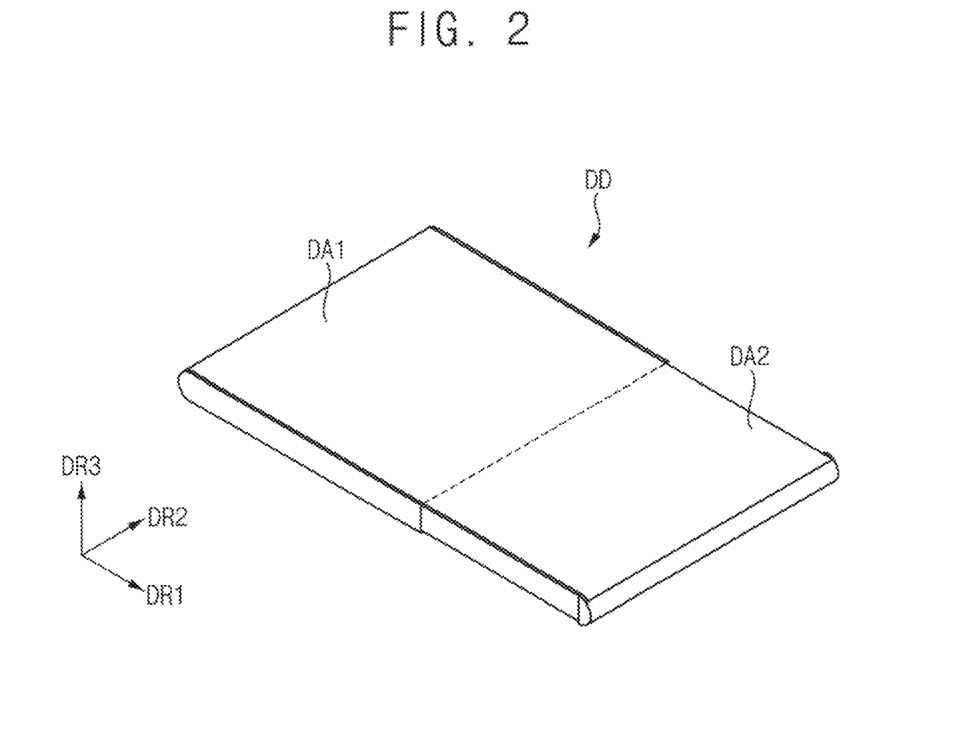

FIGS. 1 and 2 are perspective views of a display device according to embodiments of the disclosure.

Referring to FIGS. 1 and 2, an embodiment of a display device DD may be a slidable display device including a first display region DA1 and a second display region DA2. The display device DD may slide out in a first direction DR1, and may slide in in a direction opposite to the first direction DR1.

The first display region DA1 may be a region that is always exposed to an outside of the display device DD. The second display region DA2 may extend from one side of the first display region DA1. The second display region DA2 may be a region that is accommodated in the display device DD when the display device DD is in a folded state (e.g., a sliding-in state), and exposed to the user of the display device DD when the display device DD is in an unfolded state (e.g., a sliding-out state). Each of the first display region DA1 and the second display region DA2 may display an image.

In an embodiment, as shown in FIG. 1, when the display device DD is in the sliding-in state, the second display region DA2 may be accommodated in the display device DD. In this case, a user of the display device DD may be allowed to view an image displayed in the first display region DA1.

In an embodiment, as shown in FIG. 2, when a portion of the display device DD is in a sliding-out state, a portion of the second display region DA2 may be exposed. In this case, the user of the display device DD may be allowed to view the image displayed in the first display region DA1 and an image displayed in the portion of the second display region DA2.

Figure 3:
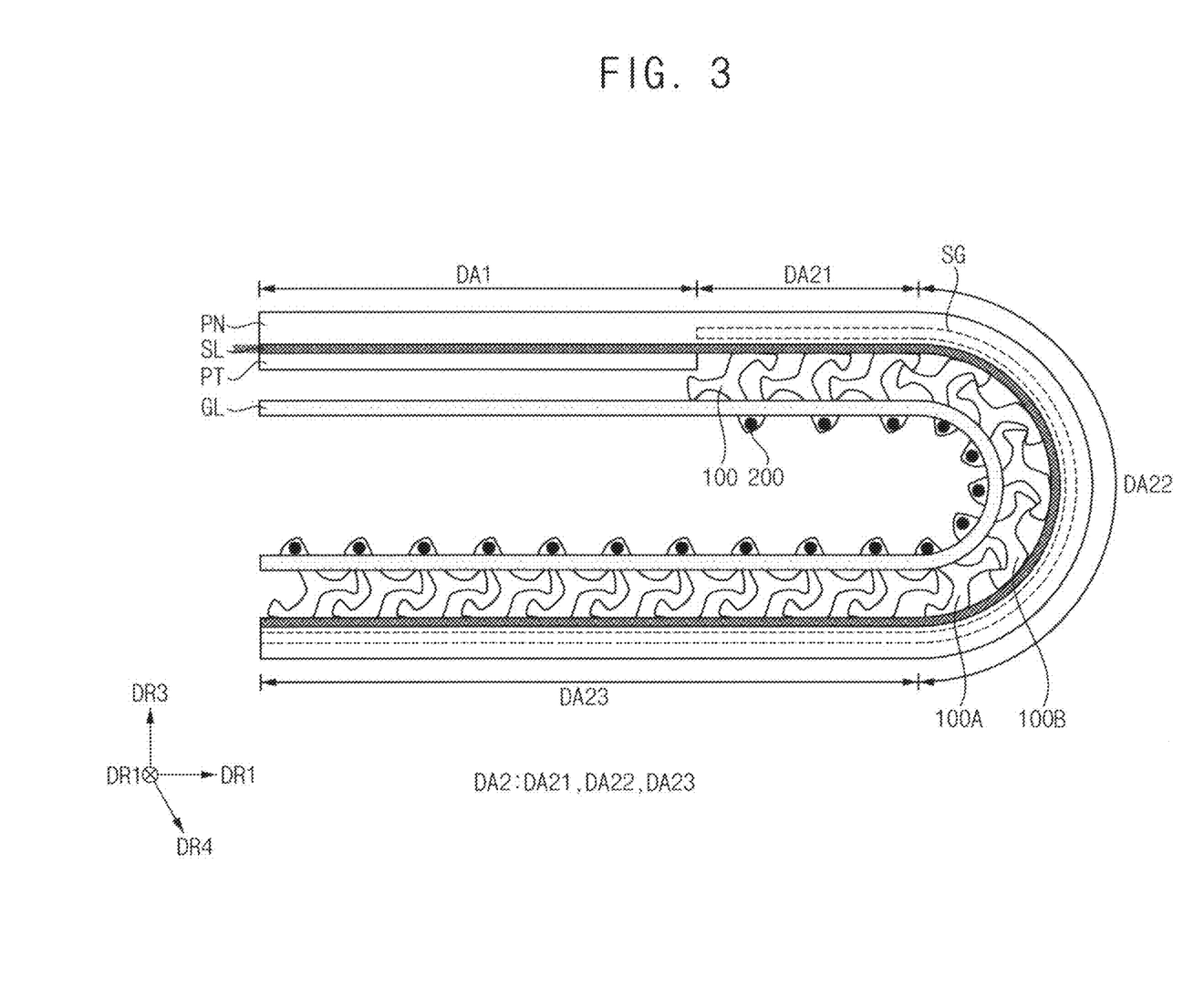
FIG. 3 is a cross-sectional view of a display device according to an embodiment of the disclosure.
Figure 4:
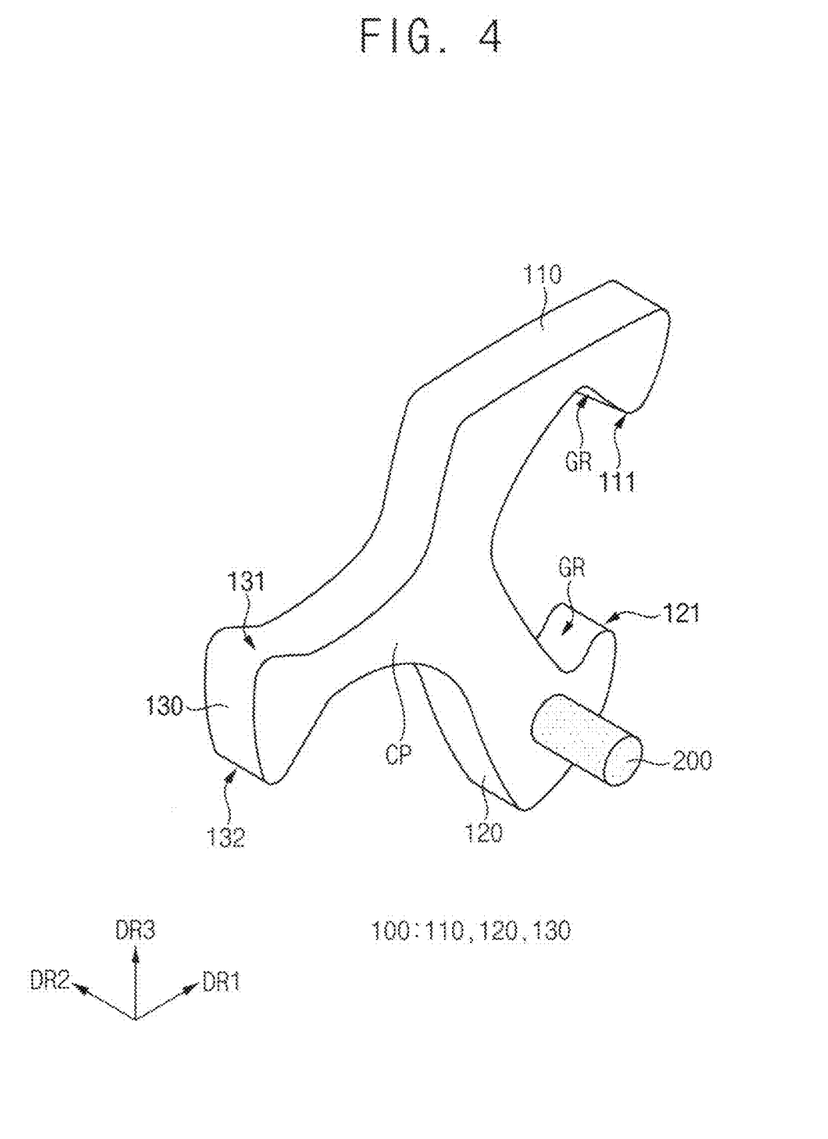
FIG. 4 is a perspective view of a segment member included in the display device of FIG. 3.

FIG. 3 is a cross-sectional view of a display device according to an embodiment of the disclosure. FIG. 4 is a perspective view for describing a segment member included in the display device of FIG. 3.

FIG. 3 is a view showing a display device DD of FIG. 2 when viewed in a second direction DR2 that is perpendicular to a first direction DR1, and only some of the components included in the display device DD are shown in FIG. 3 for convenience of illustration and description.

Referring to FIG. 3, an embodiment of the display device DD may include a first display region DA1 and a second display region DA2, and the second display region DA2 may include: a first flat region DA21 that is adjacent to the first display region DA1; a curved region DA22 that is adjacent to the first flat region DA21; and a second flat region DA23 that is adjacent to the curved region DA22. The first display region DA1 may be opposite to the second flat region DA23. An image may be displayed in the first display region DA1, the first flat region DA21, and one portion of the curved region DA22 that is adjacent to the first flat region DA21; and another portion of the curved region DA22 and the second flat region DA23 may be regions accommodated in the display device DD.

In an embodiment, when the display device DD slides out from the sliding-in state, that is, when the display device DD transitions from the sliding-in state to a sliding-out state, an area of the first flat region DA21 may be increased, and an area of the second flat region DA23 may be decreased. In such an embodiment, when the display device DD slides in from the sliding-out state, the area of the first flat region DA21 may be decreased, and the area of the second flat region DA23 may be increased. In such an embodiment, an area of the curved region DA22 may be substantially constant regardless of the sliding-out and the sliding-in of the display device DD.

Referring to FIGS. 3 and 4, an embodiment of the display device DD may include a display module PN, a support layer SL, a support plate PT, a segment member 100, and a guide rail GL.

The display module PN may include a plurality of pixels configured to display an image, and a driver configured to supply electric signals to the pixels. One portion of the display module PN may have a curved shape.

According to an embodiment, the display module PN may have a substantially flat surface in a region overlapping the first display region DA1, the first flat region DA21, and the second flat region DA23. In such an embodiment, the display module PN may have a curved shape in a region overlapping the curved region DA22. In an embodiment, for example, the display module PN may have a predetermined radius of curvature in the region overlapping the curved region DA22.

According to an embodiment, the display module PN may include a resistance measurement wire SG disposed in the second display region DA2. The resistance measurement wire SG may extend in a direction extending from the first display region DA1 to the second display region DA2 (e.g., the first direction DR1). The resistance measurement wire SG may be electrically insulated from the pixels and the driver.

The resistance measurement wire SG may be curved to correspond to a curved shape of the one portion of the display module PN. In an embodiment, for example, the resistance measurement wire SG may be substantially flat in a region overlapping the first flat region DA21 and the second flat region DA23, and may have a curved shape in the region overlapping the curved region DA22.

As the display device DD slides in and out, a position of a curved portion of the resistance measurement wire SG may vary. Accordingly, a resistance of the resistance measurement wire SG may vary, and a curve defect of the display device DD may be identified by measuring a variation of the resistance of the resistance measurement wire SG.

The support layer SL may be disposed on a bottom surface of (or under) the display module PN. In an embodiment, for example, as shown in FIG. 3, the support layer SL may cover an entire bottom surface of the display module PN. In an alternative embodiment, for example, the support layer SL may cover the bottom surface of the display module PN in a region overlapping the second display region DA2. The support layer SL may include a material having relatively high rigidity, so that the support layer SL may support the display module PN.

According to an embodiment, the support layer SL may include a plurality of opening patterns in the region overlapping the second display region DA2. In such an embodiment where the opening patterns are defined in the support layer SL, the support layer SL may be relatively more flexible, so that the support layer SL may be prevented from being damaged in the region overlapping the curved region DA22.

The support plate PT may be disposed on the bottom surface of the support layer SL in the region overlapping the first display region DA1. The support plate PT may include a material having relatively high rigidity. In an embodiment, for example, rigidity of the support plate PT may be greater than rigidity of the support layer SL. The support plate PT may have a substantially flat surface. The support plate PT may support the display panel PN.

The segment member 100 may be disposed on the bottom surface of the support layer SL in the region overlapping the second display region DA2. In an embodiment, as shown in FIG. 4, the segment member 100 may include a center part CP, a support part 110, an extension part 120, a coupling part 130, and a guide part 200. Each of the support part 110, the extension part 120, and the coupling part 130 may be a part extending from the center part CP.

In an embodiment, as shown in FIG. 4, the support part 110 may extend from the center part CP in a direction intersecting a third direction DR3 that is perpendicular to the first direction DR1 and the second direction DR2. The support part 110 may be a part making direct contact with the bottom surface of the support layer SL. The support part 110 may support the display module PN in the region overlapping the second display region DA2.

As shown in FIG. 4, the extension part 120 may extend from the center part CP in a fourth direction (DR4 in FIG. 3) that is perpendicular to the second direction DR2 and intersects the first and third directions DR1 and DR3. The extension part 120 may define a coupling groove GR together with the support part 110.

As shown in FIG. 4, the coupling part 130 may extend from the center part CP in a direction opposite to the coupling groove GR. In an embodiment, for example, the coupling part 130 may extend from the center part CP in the direction opposite to the first direction DR1.

The guide part 200 may protrude from a side surface of the extension part 120. In an embodiment, for example, as shown in FIG. 4, the guide part 200 may protrude from the side surface of the extension part 120 in a direction opposite to the second direction DR2.

According to an embodiment, the segment member 100 may include: a first protrusion 111 protruding from one end of the support part 110 spaced apart from the center part CP; a second protrusion 121 protruding from one end of the extension part 120 spaced apart from the center part CP; and third and fourth protrusions 131 and 132 protruding from one end of the coupling part 130 spaced apart from the center part CP.

The first protrusion 111 may protrude in a direction away from the bottom surface of the display module PN. In an embodiment, for example, as shown in FIG. 4, the first protrusion 111 may protrude in a direction opposite to the third direction DR3.

The second protrusion 121 may protrude in a direction opposite to a protruding direction of the first protrusion 111. In an embodiment, for example, as shown in FIG. 4, the second protrusion 121 may protrude in the third direction DR3.

The third protrusion 131 may protrude in the direction opposite to the protruding direction of the first protrusion 111. In an embodiment, for example, as shown in FIG. 4, the third protrusion 131 may protrude in the third direction DR3.

The fourth protrusion 132 may protrude in a direction opposite to a protruding direction of the third protrusion 131. In an embodiment, for example, as shown in FIG. 4, the fourth protrusion 132 may protrude in the direction opposite to the third direction DR3.

According to an embodiment, two adjacent segment members disposed under the one portion of the display module PN having the curved shape may be engaged with each other. In such an embodiment, in first and second segment members 100A and 100B disposed in the region overlapping the curved region DA22, a coupling part 130 of the first segment member 100A may be engaged with a support part 110 of the second segment member 100B while being within a coupling groove GR of the second segment member 100B. In such an embodiment, a third protrusion 131 of the first segment member 100A may be engaged with a first protrusion 111 of the second segment member 100B. According to an embodiment of the disclosure, the first segment member 100A and the second segment member 100B are engaged with each other, when the display device DD slides in or out, such that a curve defect may be prevented from occurring in the curved region DA22.

According to an embodiment, the coupling part 130 of the first segment member 100A may be spaced apart from an extension part 120 of the second segment member 100B while being within the coupling groove GR of the second segment member 100B. In such an embodiment, a fourth protrusion 132 of the first segment member 100A may be spaced apart from the extension part 120 of the second segment member 100B and a second protrusion 121 of the second segment member 100B.

According to an embodiment, two adjacent segment members disposed in the region overlapping the first flat region DA21 and the second flat region DA23 may be spaced apart from each other. In such an embodiment, the two adjacent segment members disposed in the region overlapping the first flat region DA21 and the second flat region DA23 may not be engaged with each other.

The guide rail GL may be disposed on both sides of the display module PN. The guide rail GL may have a curved shape to correspond to the curved shaped of the one portion of the display module PN. In an embodiment, for example, the guide rail GL may have a curved shape in the region overlapping the curved region DA22.

The guide part 200 may make direct contact with the guide rail GL. When the display device DD slides in or out, the guide part 200 may move along the guide rail GL. Accordingly, when the display device DD slides in or out, the segment member 100 may be guided by the guide rail GL, so that the curve defect may be prevented from occurring in the curved region DA22.

Figure 5:
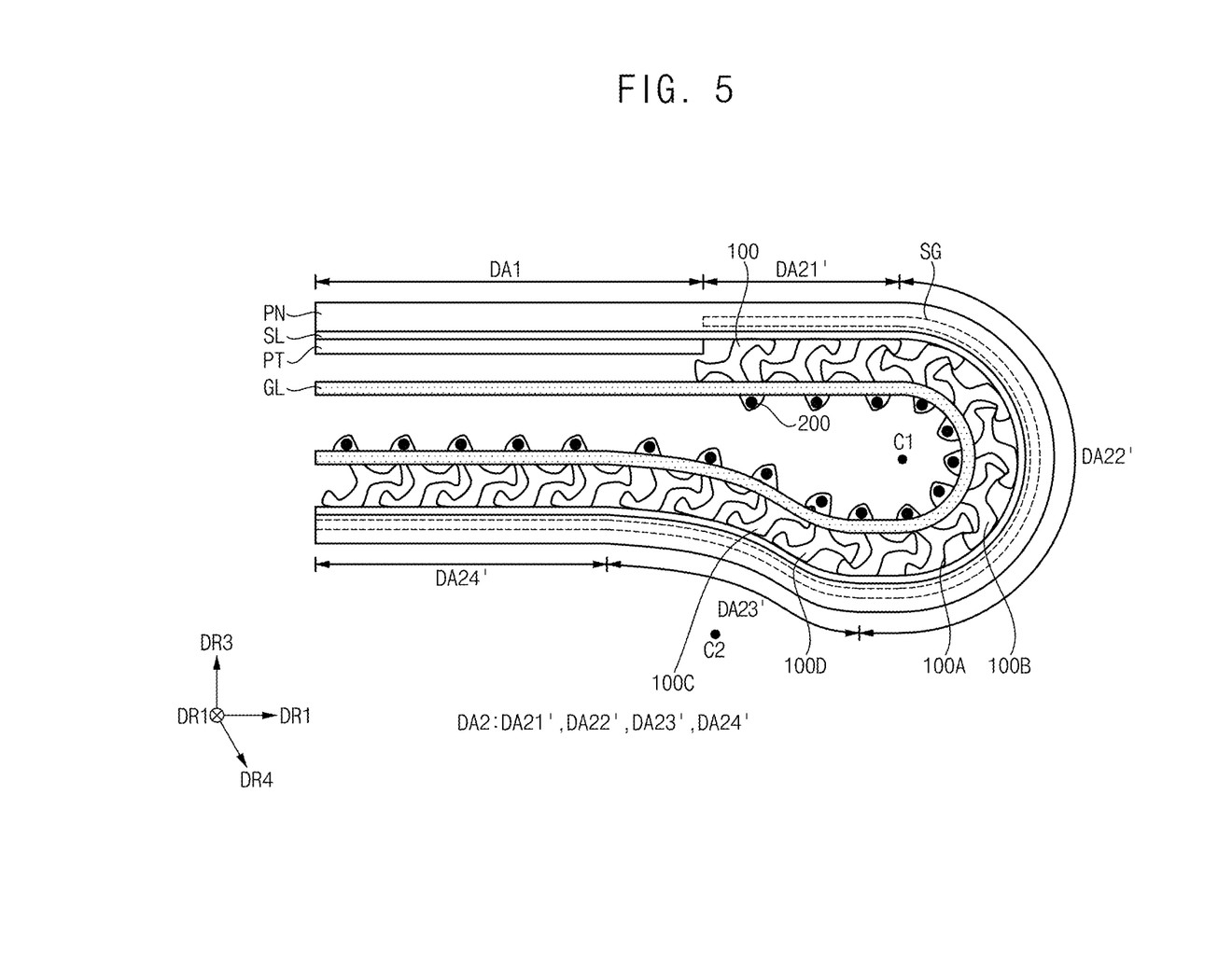
FIG. 5 is a cross-sectional view of a display device according to an alternative embodiment of the disclosure.

FIG. 5 is a cross-sectional view of a display device according to an alternative embodiment of the disclosure.

FIG. 5 is a view showing the display device DD of FIG. 2 when viewed in the second direction DR2, and only some of the components included in the display device DD have been shown in FIG. 5 for convenience of illustration and description. Some configurations shown in FIG. 5 may be substantially the same as some configurations described with reference to FIGS. 3 and 4, and any repetitive detailed descriptions thereof may hereinafter be omitted.

Referring to FIG. 5, an embodiment of a display device DD may include a first display region DA1 and a second display region DA2, and the second display region DA2 may include: a first flat region DA21' that is adjacent to the first display region DA1; a first curved region DA22' that is adjacent to the first flat region DA21'; a second curved region DA23' that is adjacent to the first curved region DA22'; and a second flat region DA24' that is adjacent to the second curved region DA23'. The first display region DA1 may be opposite to the second flat region DA24'. An image may be displayed in the first display region DA1, the first flat region DA21', and one portion of the first curved region DA22' that is adjacent to the first flat region DA21'; and another portion of the first curved region DA22', the second curved region DA23', and the second flat region DA24' may be regions accommodated in the display device DD.

In an embodiment, when the display device DD slides out from the sliding-in state, an area of the first flat region DA21' may be increased, and an area of the second flat region DA24' may be decreased. In such an embodiment, when the display device DD slides in from the sliding-out state, the area of the first flat region DA21' may be decreased, and the area of the second flat region DA24' may be increased. In such an embodiment, an area of the first curved region DA22' and an area of the second curved region DA23' may be substantially constant regardless of the sliding-out and the sliding-in of the display device DD.

Referring to FIG. 5, an embodiment of the display device DD may include a display module PN, a support layer SL, a support plate PT, a segment member 100, and a guide rail GL'.

The display module PN may include a plurality of pixels configured to display an image, and a driver configured to supply electric signals to the pixels.

According to an embodiment, the display module PN may have a substantially flat surface in a region overlapping the first display region DA1, the first flat region DA21', and the second flat region DA24'. In such an embodiment, the display module PN may have a curved shape in a region overlapping the first curved region DA22' and the second curved region DA23'. In an embodiment, for example, the display module PN may have a predetermined radius of curvature in a region overlapping the first curved region DA22'.

According to an embodiment, the display module PN may have a first curvature center C1 in the region overlapping the first curved region DA22'. The first curvature center C1 may be a curvature center of an average radius of curvature of the display module PN in the region overlapping the first curved region DA22'. The display module PN may have a second curvature center C2 in a region overlapping the second curved region DA23'. The second curvature center C2 may be a curvature center of an average radius of curvature of the display module PN in the region overlapping the second curved region DA23'. In such an embodiment, an imaginary line connecting the first curvature center C1 to the second curvature center C2 may pass through the display module PN. In such an embodiment, the display module PN may be located between the first curvature center C1 and the second curvature center C2. Accordingly, a distance between the display module PN in a region overlapping the first display region DA1 and the display module PN in a region overlapping the second flat region DA24' may become relatively small, so that space efficiency of the display device DD may be improved.

In such an embodiment, since the display module PN is curved in the region overlapping the first curved region DA22' and curved in the region overlapping the second curved region DA23', a distance from a portion of the display module PN overlapping the first display region DA1 to a portion of the display module PN overlapping the second flat region DA24' may become relatively small.

According to an embodiment, the display module PN may include a resistance measurement wire SG disposed in the second display region DA2. The resistance measurement wire SG may extend in a direction extending from the first display region DA1 to the second display region DA2. The resistance measurement wire SG may be electrically insulated from the pixels and the driver.

The resistance measurement wire SG may be curved to correspond to a curve of the display module PN. In an embodiment, for example, the resistance measurement wire SG may be substantially flat in a region overlapping the first flat region DA21' and the second flat region DA24', and may have a curved shape in the region overlapping the first curved region DA22' and the second curved region DA23'.

As the display device DD slides in and out, a position of a curved portion of the resistance measurement wire SG may vary. Accordingly, a resistance of the resistance measurement wire SG may vary, and a curve defect of the display device DD may be identified by measuring a variation of the resistance of the resistance measurement wire SG.

The segment member 100 may be disposed on the bottom surface of the support layer SL in the region overlapping the second display region DA2. The segment member 100 may be substantially the same as the segment member 100 described above with reference to FIG. 4. In an embodiment, for example, the segment member 100 may include a center part CP, a support part 110, an extension part 120, a coupling part 130, a first protrusion 111, a second protrusion 121, a third protrusion 131, a fourth protrusion 132, and a guide part 200.

According to an embodiment, in the region overlapping the first curved region DA22', two adjacent segment members disposed under one portion of the display module PN may be engaged with each other. In such an embodiment, in first and second segment members 100A and 100B disposed in the region overlapping the first curved region DA22', a coupling part 130 of the first segment member 100A may be engaged with a support part 110 of the second segment member 100B while being within a coupling groove GR of the second segment member 100B. In such an embodiment, a third protrusion 131 of the first segment member 100A may be engaged with a first protrusion 111 of the second segment member 100B. According to an embodiment of the disclosure, since the first segment member 100A and the second segment member 100B are engaged with each other, when the display device DD slides in or out, a curve defect may be prevented from occurring in the first curved region DA22'.

According to an embodiment, the coupling part 130 of the first segment member 100A may be spaced apart from an extension part 120 of the second segment member 100B while being within the coupling groove GR of the second segment member 100B. In such an embodiment, a fourth protrusion 132 of the first segment member 100A may be spaced apart from the extension part 120 of the second segment member 100B and a second protrusion 121 of the second segment member 100B.

According to an embodiment, in the region overlapping the second curved region DA23', two adjacent segment members disposed under another portion of the display module PN, which is adjacent to the one portion of the display module PN, may be engaged with each other. In such an embodiment, in third and fourth segment members 100C and 100D disposed in the region overlapping the second curved region DA23', a coupling part 130 of the third segment member 100C may be engaged with an extension part 120 of the fourth segment member 100D while being within a coupling groove GR of the fourth segment member 100D. In such an embodiment, a fourth protrusion 132 of the third segment member 100C may be engaged with a second protrusion 121 of the fourth segment member 100D. According to an embodiment of the disclosure, since the third segment member 100C and the fourth segment member 100D are engaged with each other, when the display device DD slides in or out, a curve defect may be prevented from occurring in the second curved region DA23'.

According to an embodiment, the coupling part 130 of the third segment member 100C may be spaced apart from a support part 110 of the fourth segment member 100D while being within the coupling groove GR of the fourth segment member 100D. In such an embodiment, a third protrusion 131 of the third segment member 100C may be spaced apart from the support part 110 of the fourth segment member 100D and a first protrusion 111 of the fourth segment member 100D.

According to an embodiment, two adjacent segment members disposed in the region overlapping the first flat region DA21' and the second flat region DA24' may be spaced apart from each other. In such an embodiment, the two adjacent segment members disposed in the region overlapping the first flat region DA21' and the second flat region DA24' may not be engaged with each other.

The guide rail GL' may be disposed on opposing sides of the display module PN. The guide rail GL' may have a curved shape to correspond to the curve of the display module PN. In an embodiment, for example, the guide rail GL' may have a curved shape in the region overlapping the first curved region DA22' and the second curved region DA23'.

The guide part 200 may make direct contact with the guide rail GL'. When the display device DD slides in or out, the guide part 200 may move along the guide rail GL'. Accordingly, when the display device DD slides in or out, the segment member 100 may be guided by the guide rail GL', so that the curve defect may be prevented from occurring in the first curved region DA22' and the second curved region DA23'.

Figure 6:
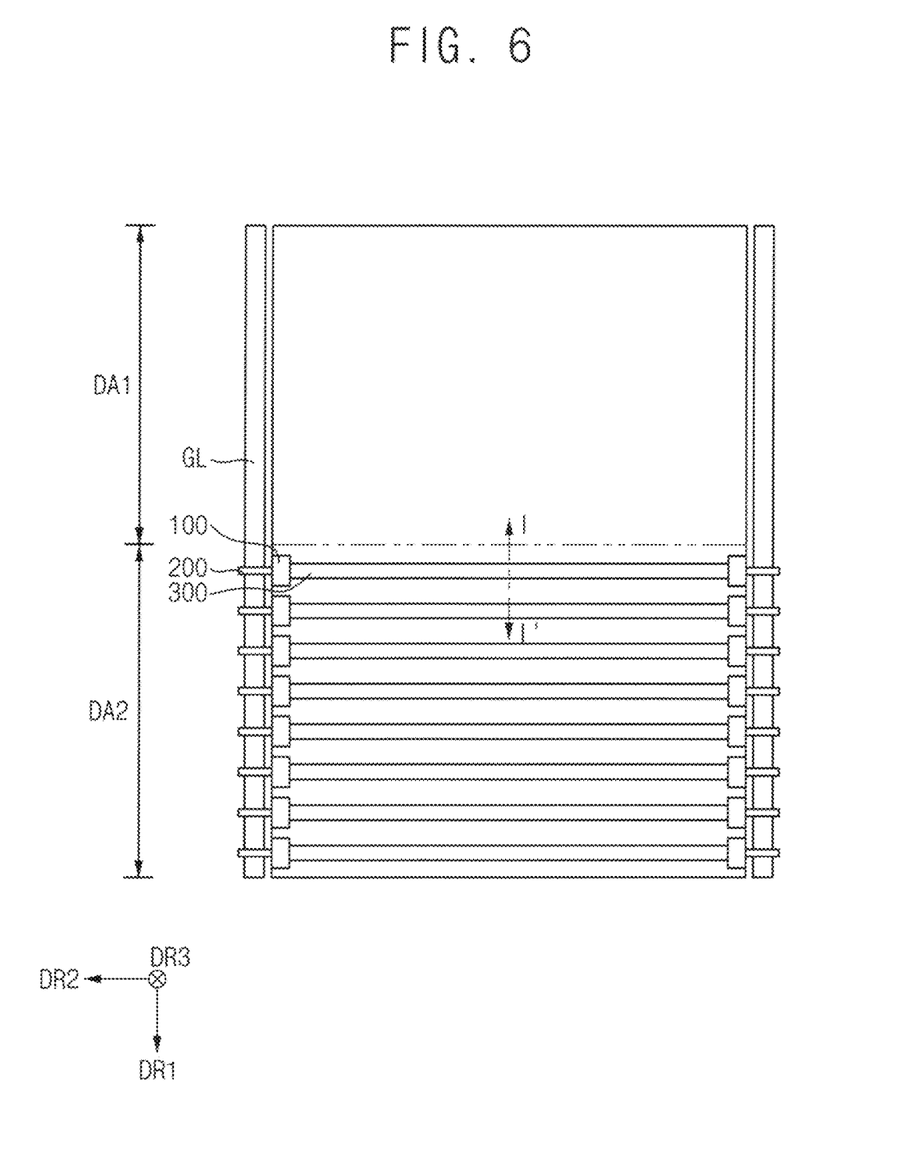
FIGS. 6 to 9 are views of the display device according to various embodiments of the disclosure.
Figure 7:
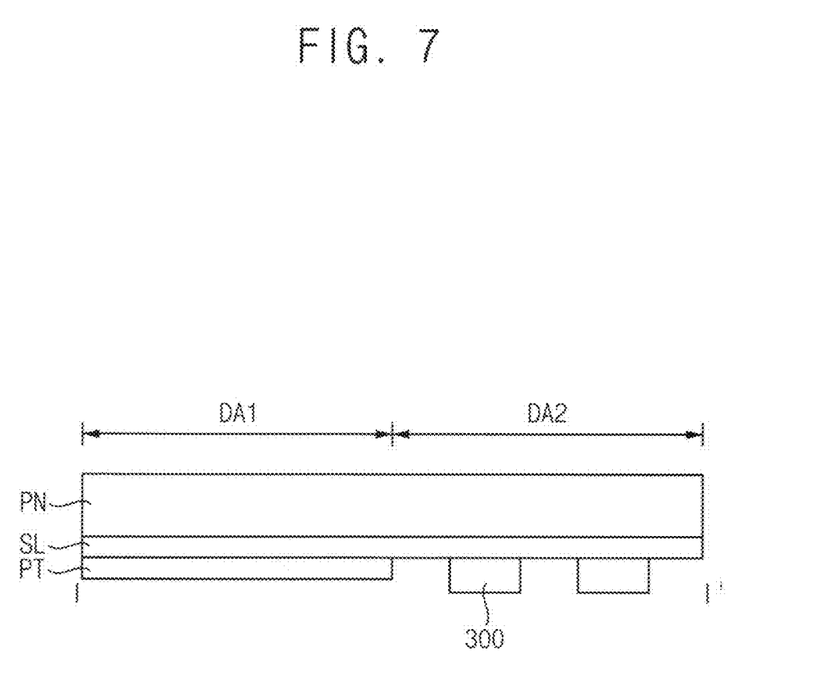
Figure 8:
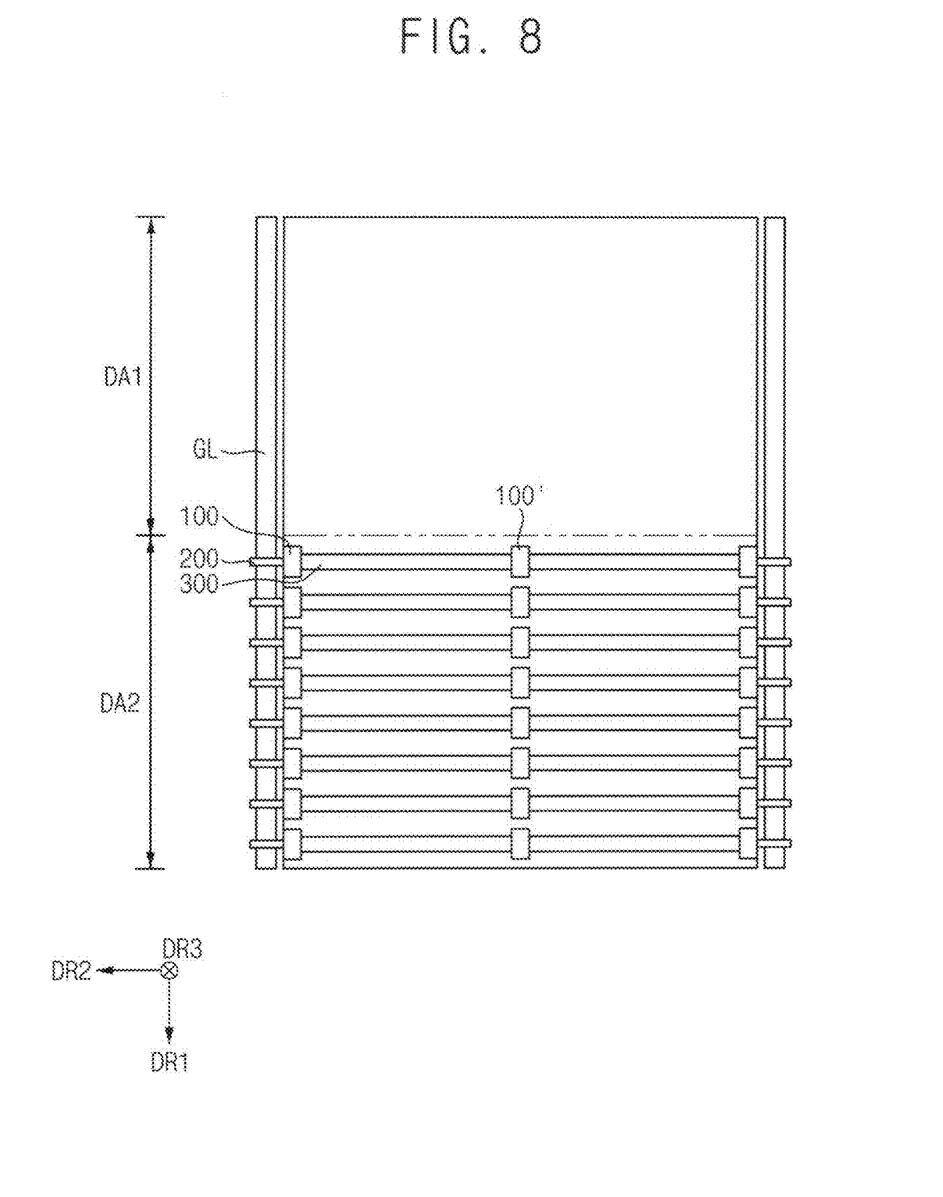
Figure 9:
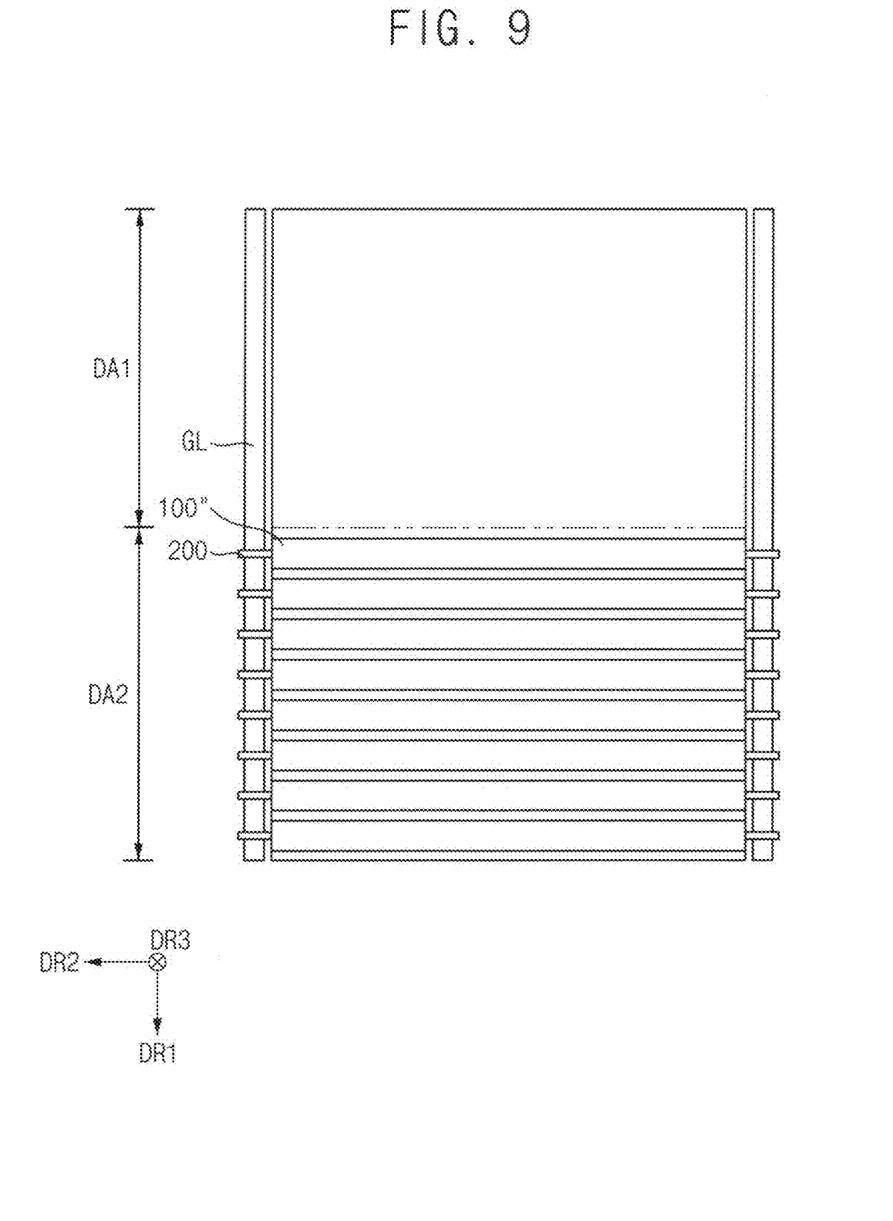

FIGS. 6 to 9 are views of the display device according to various embodiments of the disclosure. FIGS. 6, 8, and 9 may be plan views showing an embodiment of the display device DD described above with reference to FIG. 3 is in an unfolded state without being curved for convenience of description. FIG. 7 is a cross-sectional view taken along line I-I' of FIG. 6.

Referring to FIGS. 6 and 7, according to an embodiment, the segment member 100 may be disposed on opposing sides of the display device DD in the second display region DA2. In such an embodiment, a support bar 300 may be disposed between two segment members that are disposed on the opposing sides of the display device DD, respectively. The support bar 300 may extend in the second direction DR2.

The support bar 300 may include a material having relatively high rigidity. The segment member 100 and the support bar 300 may be repeatedly arranged in the first direction DR1 in the second display region DA2.

Referring to FIG. 8, according to an alternative embodiment, in the second display region DA2, the segment member 100 may be disposed on opposing sides of the display device DD, a sub-segment member 100' may be disposed between two segment members that are disposed on the both sides of the display device DD, respectively, and a support bar 300 may be disposed between the sub-segment member 100' and the two segment members that are disposed on the opposing sides of the display device DD, respectively. The sub-segment member 100' may be substantially the same as the segment member 100 described above. The segment member 100, the sub-segment member 100', and the support bar 300 may be repeatedly arranged in the first direction DR1 in the second display region DA2.

Referring to FIG. 9, according to another alternative embodiment, segment members 100" may be repeatedly arranged in the first direction DR1 in the second display region DA2. The segment member 100" may have a shape obtained by extending the segment member 100 described above with reference to FIG. 4 in the second direction DR2. In such an embodiment, the shape of the segment member 100" when viewed in the second direction DR2 may be substantially the same as a shape of the segment member 100 described above with reference to FIG. 4 when viewed in the second direction DR2.

Referring to FIGS. 6 to 9, features of the embodiments shown in FIGS. 6 to 9 may be applied to the embodiments of the display device described above with reference to FIG. 5. For example, FIGS. 6, 8, and 9 may be plan views showing a state assuming that the display device DD described with reference to FIG. 5 is in an unfolded state without being curved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display module including a first display region and a second display region extending from a side of the first display region, wherein one portion having a curved shape is defined in a portion of the second display region;
   a support layer disposed on a bottom surface of the display module; and
   a plurality of segment members, wherein each of the segment members includes a center part, a support part extending from the center part and making direct contact with a bottom surface of the support layer in a region overlapping the second display region, an extension part extending from the center part in a direction intersecting an extension direction of the support part and defining a coupling groove together with the support part, and a coupling part extending from the center part in a direction opposite to the coupling groove,
   wherein the coupling part of one segment member of two adjacent segment members disposed under the one portion of the display module is engaged with the support part of the other segment member of the two adjacent segment members and spaced apart from the extension part of the other segment member of the two adjacent segment members while being in the coupling groove of the other segment member of the two adjacent segment members.

2. The display device of claim 1, wherein each of the segment members further includes:
   a first protrusion protruding from one end of the support part spaced apart from the center part in a direction away from the bottom surface of the display module; and
   a second protrusion protruding from one end of the extension part spaced apart from the center part in a direction opposite to a protruding direction of the first protrusion.

3. The display device of claim 2, wherein each of the segment members further includes:
   a third protrusion protruding from one end of the coupling part spaced apart from the center part in the direction opposite to the protruding direction of the first protrusion; and
   a fourth protrusion protruding from the one end of the coupling part in the protruding direction of the first protrusion.

4. The display device of claim 3, wherein the third protrusion of the one segment member of the two adjacent segment members is engaged with the first protrusion of the other segment member of the two adjacent segment members.

5. The display device of claim 4, wherein the fourth protrusion of the one segment member of the two adjacent segment members is spaced apart from the second protrusion of the other segment member of the two adjacent segment members and the extension part of the other segment member of the two adjacent segment members.

6. The display device of claim 1, wherein two adjacent segment members which are adjacent to the one portion of the display module and disposed under another portion of the display module having a flat shape in the second display region are spaced apart from each other.

7. The display device of claim 1, wherein each of the segment members further includes a guide part protruding from a side surface of the extension part thereof.

8. The display device of claim 7, further comprising: a guide rail disposed on sides of the display module and having a curved shape to correspond to a curved shape of the one portion of the display module.

9. The display device of claim 8, wherein the guide part makes direct contact with the guide rail.

10. The display device of claim 1, wherein the display module further includes a resistance measurement wire disposed in the second display region and extending in an extension direction of the second display region.

11. A display device comprising:
    a display module including a first display region and a second display region extending from a side of the first display region, wherein the second display region includes a first curved region and a second curved region which is adjacent to the first curved region, one portion having a curved shape is defined in the first curved region, and another portion, which is adjacent to the one portion and has a curved shape, is defined in the second curved region;

a support layer disposed on a bottom surface of the display module, and a plurality of segment members, wherein each of the segment members includes a center part, a support part extending from the center part and making direct contact with a bottom surface of the support layer in a region overlapping the second display region, an extension part extending from the center part in a direction intersecting an extension direction of the support part and defining a coupling groove together with the support part, and a coupling part extending from the center part in a direction opposite to the coupling groove, wherein an imaginary line connecting a first curvature center of the one portion of the display module in the first curved region to a second curvature center of the another portion of the display module in the second curved region passes through the display module, wherein the coupling part of one segment member of two adjacent segment members disposed under the another portion of the display module is engaged with the extension part of the other segment member of the two adjacent segment members and spaced apart from the support part of the other segment member of the two adjacent segment members while being within the coupling groove of the other segment member of the two adjacent segment members.

12. The display device of claim 11, wherein each of the segment members further includes:

a first protrusion protruding from one end of the support part spaced apart from the center part in a direction away from the bottom surface of the display module;

a second protrusion protruding from one end of the extension part spaced apart from the center part in a direction opposite to a protruding direction of the first protrusion;

a third protrusion protruding from one end of the coupling part spaced apart from the center part in the direction opposite to the protruding direction of the first protrusion; and a fourth protrusion protruding from the one end of the coupling part in the protruding direction of the first protrusion.

13. The display device of claim 12, wherein the fourth protrusion of the one segment member of the two adjacent segment members is engaged with the second protrusion of the other segment member of the two adjacent segment members.

14. The display device of claim 13, wherein the third protrusion of the one segment member of the two adjacent segment members is spaced apart from the first protrusion of the other segment member of the two adjacent segment members and the support part of the other segment member of the two adjacent segment members.

15. The display device of claim 11, wherein the coupling part of one segment member of two adjacent segment members disposed under the one portion of the display module is engaged with the support part of the other segment member of the two adjacent segment members and spaced apart from the extension part of the other segment member of the two adjacent segment members while being within the coupling groove of the other segment member of the two adjacent segment members.

16. The display device of claim 15, wherein the display module further includes a resistance measurement wire disposed in the second display region and extending in an extension direction of the second display region.

17. The display device of claim 11, wherein each of the segment members further includes a guide part protruding from a side surface of the extension part thereof.

18. The display device of claim 11, further comprising a guide rail disposed on sides of the display module and having a curved shape to correspond to a curved shape of the one portion of the display module and the another portion of the display module.

* * * * *